(12) United States Patent
Benkreira et al.

(10) Patent No.: US 11,514,414 B2
(45) Date of Patent: Nov. 29, 2022

(54) PERFORMING AN ACTION BASED ON PREDICTED INFORMATION

(71) Applicant: Capital One Services, LLC, McLean, VA (US)

(72) Inventors: Abdelkader M'Hamed Benkreira, Washington, DC (US); Latika Gulati, Annandale, VA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 95 days.

(21) Appl. No.: 16/774,969

(22) Filed: Jan. 28, 2020

(65) Prior Publication Data

US 2021/0233047 A1 Jul. 29, 2021

(51) Int. Cl.
| | |
|---|---|
| *G06Q 20/10* | (2012.01) |
| *G06Q 40/02* | (2012.01) |
| *G06Q 10/10* | (2012.01) |
| *G06N 20/00* | (2019.01) |
| *G06N 5/04* | (2006.01) |

(52) U.S. Cl.
CPC ............ *G06Q 20/102* (2013.01); *G06N 5/04* (2013.01); *G06N 20/00* (2019.01); *G06Q 10/105* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 9,443,268 B1 * | 9/2016 | Kapczynski | G06Q 40/025 |
| 2010/0076873 A1 | 3/2010 | Taylor et al. | |
| 2011/0295731 A1 | 12/2011 | Waldron, III et al. | |
| 2013/0325599 A1 * | 12/2013 | Yeri | G06Q 40/02 |
| | | | 705/14.49 |
| 2015/0127595 A1 * | 5/2015 | Hawkins, II | G06N 7/005 |
| | | | 706/46 |
| 2018/0247227 A1 * | 8/2018 | Holtham | G06N 20/00 |
| 2019/0180358 A1 * | 6/2019 | Nandan | G06K 9/6219 |

* cited by examiner

*Primary Examiner* — Jason Borlinghaus
(74) *Attorney, Agent, or Firm* — Harrity & Harrity, LLP

(57) ABSTRACT

A device may obtain user information associated with a user and first account information associated with the user. The device may determine, based on the user information, user employment information and may determine, based on the first account information, user compensation information. The device may process, using a first machine learning model, the user employment information and the user compensation information to determine predicted future user compensation information. The device may obtain second account information associated with the user and may determine, based on the second account information, new user compensation information. The device may determine whether the new user compensation information is consistent with the predicted future user compensation information. The device may determine a predicted reason for the new user compensation information not being consistent with the predicted future user compensation information. The device may cause, based on the predicted reason, at least one action to be performed.

20 Claims, 9 Drawing Sheets

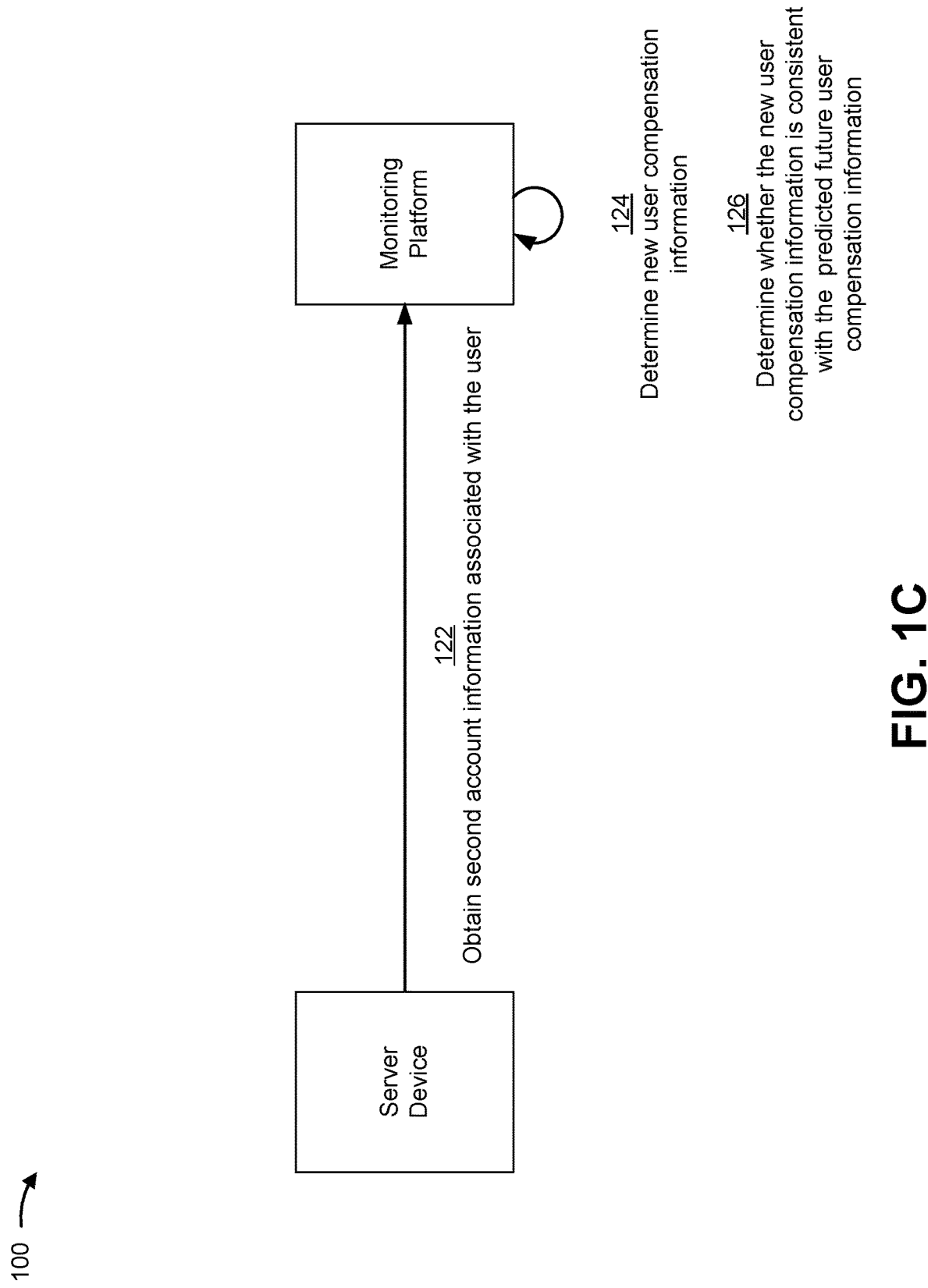

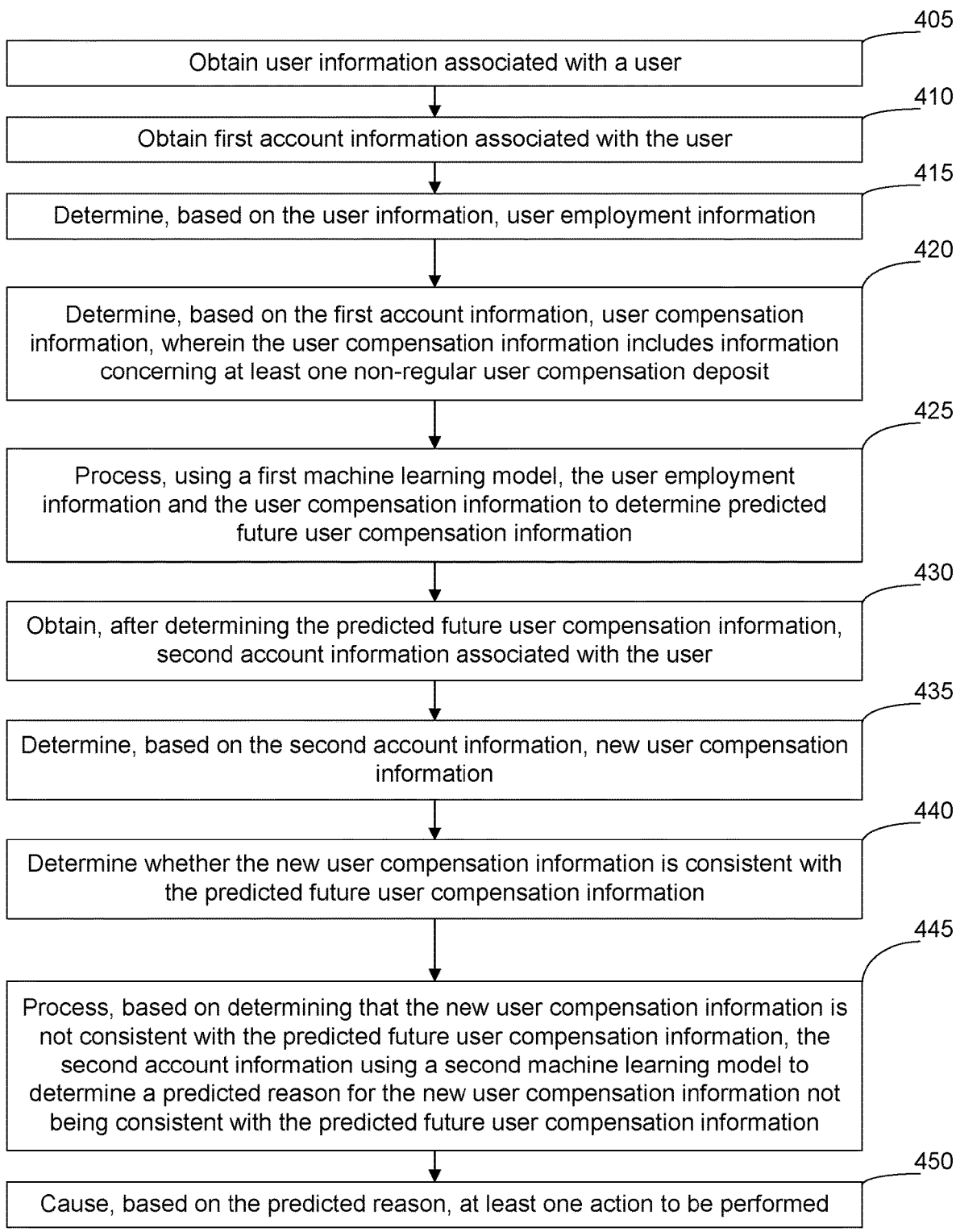

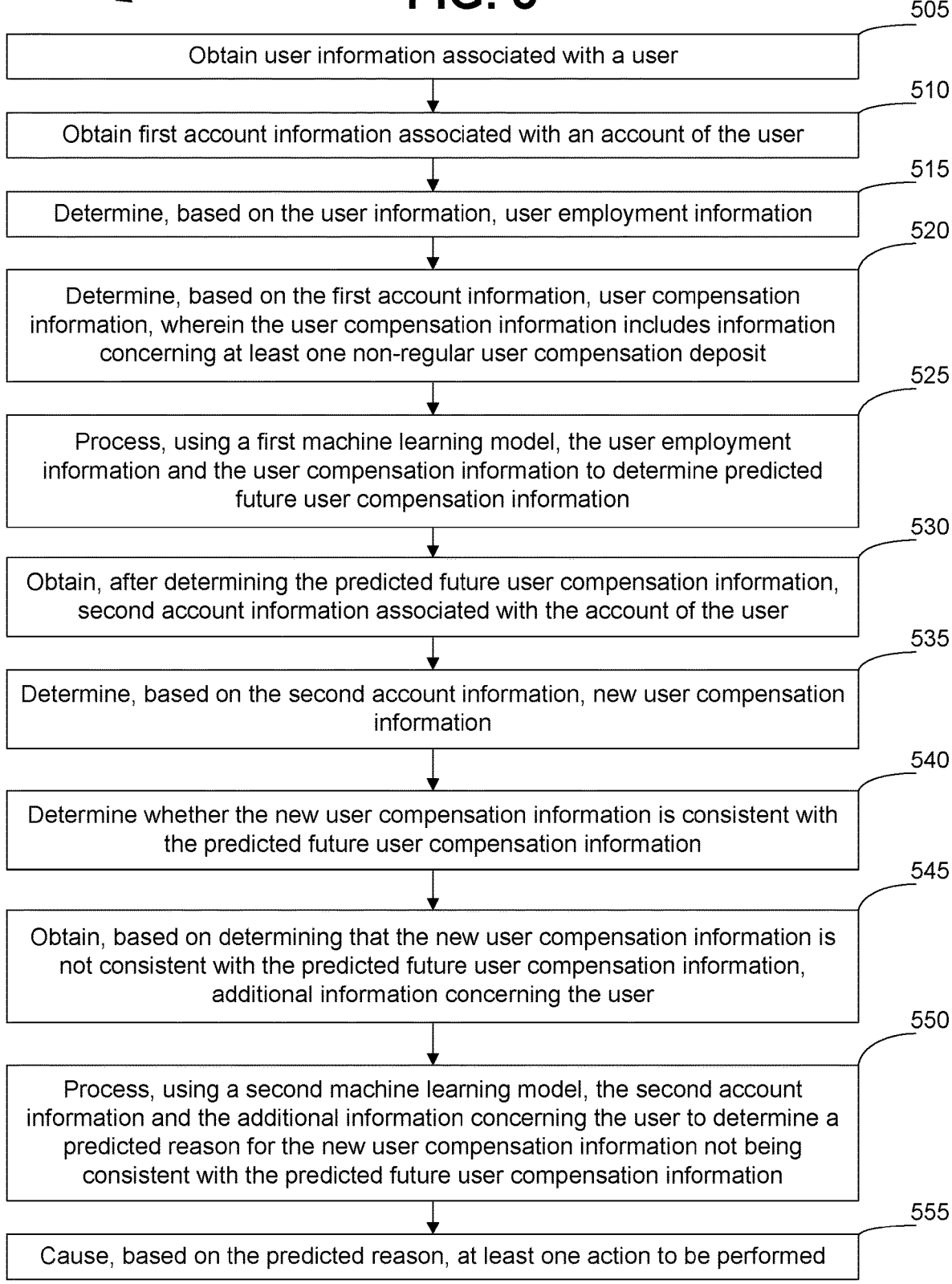

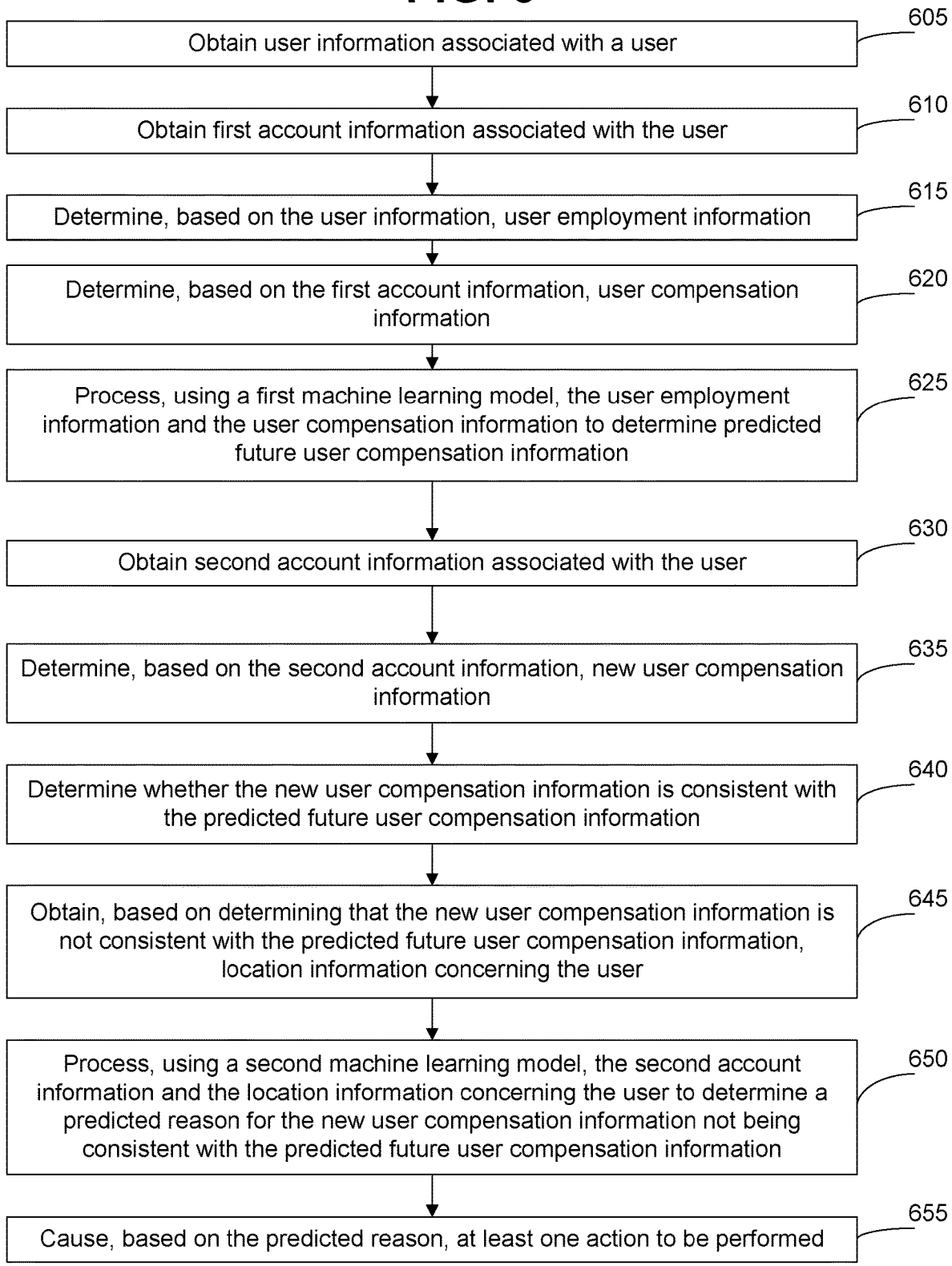

1

PERFORMING AN ACTION BASED ON PREDICTED INFORMATION

BACKGROUND

Account information may include information that concerns a user and/or an account of the user. The account information may include deposit information that concerns one or more deposits (e.g., cash deposits, check deposits, paycheck deposits, refund deposits, reimbursement deposits, and/or the like).

SUMMARY

According to some implementations, a method may include obtaining, by a device, user information associated with a user; obtaining, by the device, first account information associated with the user; determining, by the device and based on the user information, user employment information; determining, by the device and based on the first account information, user compensation information, wherein the user compensation information includes information concerning at least one non-regular user compensation deposit; processing, by the device and using a first machine learning model, the user employment information and the user compensation information to determine predicted future user compensation information; obtaining, by the device and after determining the predicted future user compensation information, second account information associated with the user; determining, by the device and based on the second account information, new user compensation information; determining, by the device, whether the new user compensation information is consistent with the predicted future user compensation information; processing, by the device and based on determining that the new user compensation information is not consistent with the predicted future user compensation information, the second account information using a second machine learning model to determine a predicted reason for the new user compensation information not being consistent with the predicted future user compensation information; and causing, by the device and based on the predicted reason, at least one action to be performed.

According to some implementations, a device may include one or more memories; and one or more processors, communicatively coupled to the one or more memories, to: obtain user information associated with a user; obtain first account information associated with an account of the user; determine, based on the user information, user employment information; determine, based on the first account information, user compensation information, wherein the user compensation information includes information concerning at least one non-regular user compensation deposit; process, using a first machine learning model, the user employment information and the user compensation information to determine predicted future user compensation information; obtain, after determining the predicted future user compensation information, second account information associated with the account of the user; determine, based on the second account information, new user compensation information; determine whether the new user compensation information is consistent with the predicted future user compensation information; obtain, based on determining that the new user compensation information is not consistent with the predicted future user compensation information, additional information concerning the user; process, using a second machine learning model, the second account information

2 and the additional information concerning the user to determine a predicted reason for the new user compensation information not being consistent with the predicted future user compensation information; and cause, based on the predicted reason, at least one action to be performed.

According to some implementations, a non-transitory computer-readable medium may store instructions comprising one or more instructions that, when executed by one or more processors, may cause the one or more processors to: obtain user information associated with a user; obtain first account information associated with the user; determine, based on the user information, user employment information; determine, based on the first account information, user compensation information; process, using a first machine learning model, the user employment information and the user compensation information to determine predicted future user compensation information; obtain, after determining the predicted future user compensation information, second account information associated with the user; determine, based on the second account information, new user compensation information; determine whether the new user compensation information is consistent with the predicted future user compensation information; obtain, based on determining that the new user compensation information is not consistent with the predicted future user compensation information, location information concerning the user; process, using a second machine learning model, the second account information and the location information concerning the user to determine a predicted reason for the new user compensation information not being consistent with the predicted future user compensation information; and cause, based on the predicted reason, at least one action to be performed.

BRIEF DESCRIPTION OF THE DRAWINGS

FIGS. 1A-1D are diagrams of example implementations described herein.

FIGS. 4-6 are flow charts of example processes for performing an action based on predicted information.

DETAILED DESCRIPTION

Figure 1A:
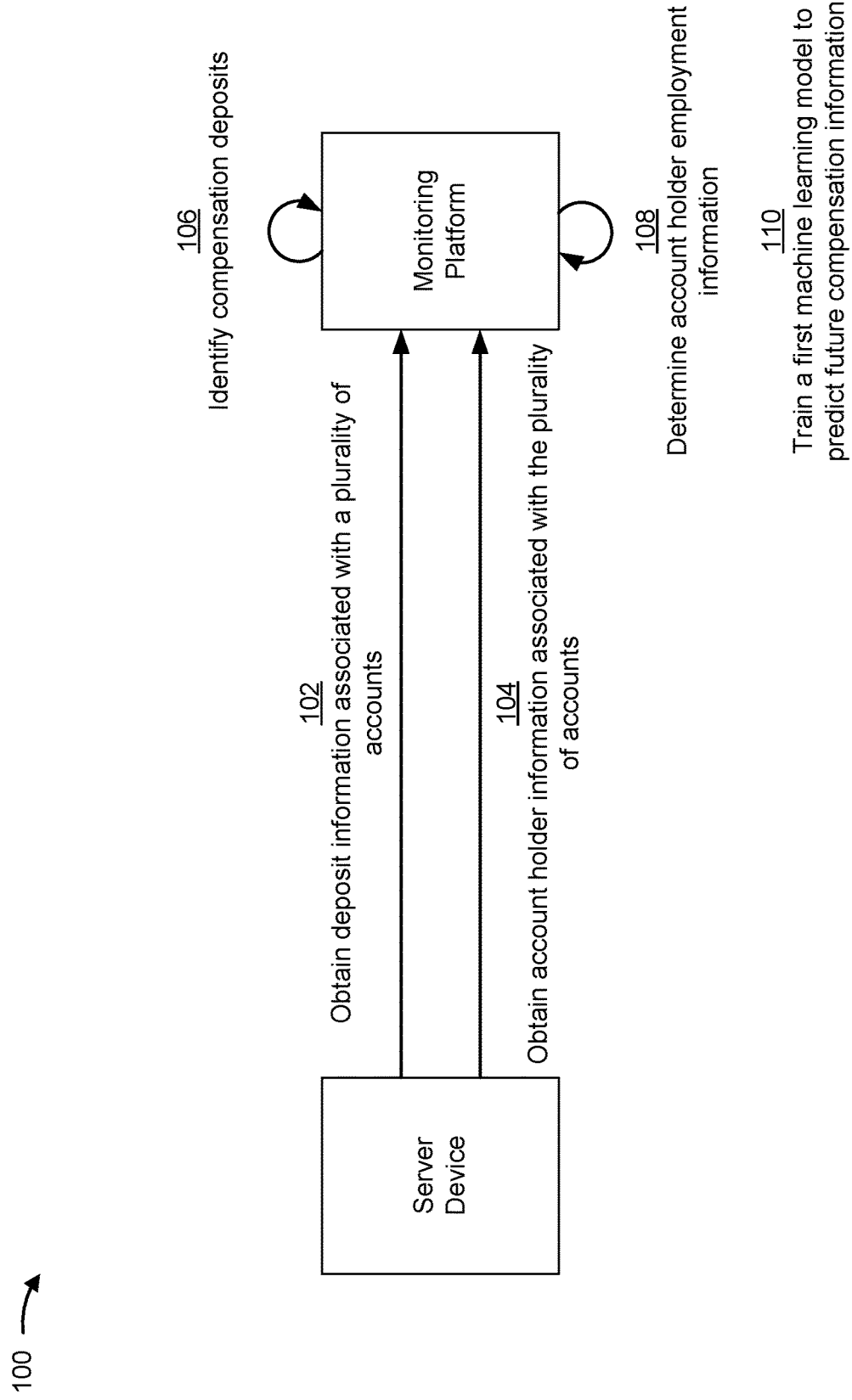

The following detailed description of example implementations refers to the accompanying drawings. The same reference numbers in different drawings may identify the same or similar elements.

A user may receive compensation for services performed for an employer. Accordingly, in some instances, compensation deposits (e.g., paycheck deposits, bonus deposits, commission deposits, and/or the like) may be deposited to an account of the user. In some cases, the user may enroll the account in automated services, such as automated bill payment services. In such cases, bill payments and/or other financial transactions are automatically performed, regardless of an employment status of the user and/or a balance of the account. However, if the user's employment status changes and/or an amount or timing of the compensation deposits changes, the account may not have enough funds to cover an automated service, such as an automatic bill payment. This can result in a device, such as a server device, associated with the account performing one or more servicing actions to service the account for insufficient funds (e.g., generate and send a message to a user device of the user, cancel the automated service, charge a fee for insufficient funds, modify other automated services associated with the account, set up a payment plan, and/or the like). This may consume resources (e.g., processing resources, memory resources, power resources, communication resources, and/or the like) of the device to perform the one or more servicing actions.

Some implementations described herein provide a monitoring platform that may predict a reason for why an amount or timing of a compensation deposit may be different than expected and may cause at least one action to be performed to minimize a likelihood that the one or more servicing actions need to be performed. In some implementations, the monitoring platform may obtain user information associated with a user and first account information associated with the user. In some implementations, the monitoring platform may determine, based on the user information, user employment information and may determine, based on the first account information, user compensation information. In some implementations, the monitoring platform may process, using a first machine learning model, the user employment information and the user compensation information to determine predicted future user compensation information. In some implementations, the monitoring platform may obtain second account information associated with the user and may determine, based on the second account information, new user compensation information. In some implementations, the monitoring platform may determine whether the new user compensation information is consistent with the predicted future user compensation information and may determine a predicted reason for the new user compensation information not being consistent with the predicted future user compensation information. In some implementations, the monitoring platform may cause, based on the predicted reason, at least one action to be performed.

In this way, the monitoring platform reduces a demand for resources (e.g., processing resources, memory resources, power resources, communication resources, and/or the like) of a device, such as a server device, associated with the account of the user. For example, the monitoring platform may cause at least one action to be performed (e.g., enrolling the account of the user in an account protection plan, such as an overdraft protection plan), which may reduce a likelihood that the one or more servicing actions need to be performed by the device.

FIGS. 1A-1D are diagrams of example implementation(s) 100 described herein. As shown in FIG. 1A, example implementation(s) 100 may include a server device and/or a monitoring platform. In some implementations, the server device and/or the monitoring platform may be connected via a network, such as a wired network (e.g., the Internet or another data network), a wireless network (e.g., a wireless local area network, a wireless wide area network, a cellular network, etc.), and/or the like. Some example implementations described herein concern a single server device and/or a single monitoring platform, but implementations can include a plurality of server devices and/or a plurality of monitoring platforms.

As shown in FIG. 1A and by reference number 102, the monitoring platform may obtain deposit information from the server device. The deposit information may be associated with a plurality of accounts, such as a plurality of social media accounts, a plurality of financial transaction accounts, and/or the like. For each account, of the plurality of accounts, the deposit information may concern one or more deposits, such as a cash deposit, a check deposit, a paycheck deposit, a refund deposit, a reimbursement deposit, and/or the like. As shown by reference number 104, the monitoring platform may obtain account holder information from the server device. The account holder information may be associated with the plurality of accounts. For each account, the account holder information may concern identification information associated with a holder of the account.

In some implementations, the monitoring platform may process the deposit information to determine and/or identify particular information concerning the deposit information. For example, as shown by reference number 106, the monitoring platform may process the deposit information to determine and/or identify, for each account, compensation deposits (e.g., paycheck deposits, bonus payment deposits, commission payment deposits, government benefit deposits, and/or the like). In some implementations, the monitoring platform may process the account holder information to determine and/or identify particular information concerning the account holder information. For example, as shown by reference number 108, the monitoring platform may process the account holder information to determine and/or identify, for each account, account holder employment information (e.g., an employment status of the account holder; an employment title of the account holder; an employment type of the account holder; a name of an employer of the account holder; at least one address associated with the employer of the account holder; and/or the like).

As shown by reference number 110, the monitoring platform may generate and/or train a first machine learning model to predict future compensation information. For example, the monitoring platform may process the particular information concerning the deposit information (e.g., the compensation deposits associated with the plurality of accounts) and/or the particular information concerning the account holder information (e.g., the account holder employment information associated with the plurality of accounts) (hereinafter collectively referred to as the "historical information") to generate and/or train the first machine learning model to predict the future compensation information. The predicted future compensation information may include a predicted compensation amount, a predicted compensation date, a predicted compensation schedule, and/or the like.

In some implementations, the monitoring platform may perform a set of data manipulation procedures to process the historical information to generate the first machine learning model, such as a data preprocessing procedure, a model training procedure, a model verification procedure, and/or the like. For example, the monitoring platform may preprocess the historical information to remove irrelevant information, confidential data, corrupt data, and/or the like; to replace personal information with generic information; and/or the like. In this way, the monitoring platform may organize thousands, millions, or billions of data entries for machine learning and model generation.

In some implementations, the monitoring platform may perform a training operation when generating the first machine learning model. For example, the monitoring platform may portion the historical information into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, a minimum feature set may be created from pre-processing and/or dimensionality reduction of the historical information. In some implementations, the monitoring platform may train the first machine learning model on this minimum feature set, thereby reducing processing required to train the first machine learning model, and may apply a classification technique to the minimum feature set.

In some implementations, the monitoring platform may use a classification technique, such as a logistic regression classification technique, a random forest classification technique, a gradient boosting machine (GBM) classifier technique, and/or the like to determine a categorical outcome (e.g., that particular historical information is associated with a particular predicted compensation amount, a particular predicted compensation date, a particular predicted compensation schedule, and/or the like). Additionally, or alternatively, the monitoring platform may perform a recursive feature elimination procedure to split the data of the minimum feature set into partitions and/or branches, and use the partitions and/or branches to perform predictions (e.g., that particular historical information is associated with a particular predicted compensation amount, a particular predicted compensation date, a particular predicted compensation schedule, and/or the like). Based on using the recursive feature elimination procedure, the monitoring platform may reduce utilization of computing resources relative to manual, linear sorting and analysis of data points, thereby enabling use of thousands, millions, or billions of data points to train the first machine learning model, which may result in a more accurate first machine learning model than using fewer data points.

Additionally, or alternatively, the monitoring platform may use a support vector machine (SVM) classifier technique to generate a non-linear boundary between data points in the training set. In this case, the non-linear boundary is used to classify test data (e.g., historical information) into a particular class (e.g., a class indicating that particular historical information is associated with a particular predicted compensation amount, a particular predicted compensation date, a particular predicted compensation schedule, and/or the like).

Additionally, or alternatively, the monitoring platform may train the first machine learning model using a supervised training procedure that includes receiving input to the model from a subject matter expert, which may reduce an amount of time, an amount of processing resources, and/or the like to train the first machine learning model relative to an unsupervised training procedure. In some implementations, the monitoring platform may use one or more other model training techniques, such as a neural network technique, a latent semantic indexing technique, and/or the like. For example, the monitoring platform may perform an artificial neural network processing technique (e.g., using a two-layer feedforward neural network architecture, a three-layer feedforward neural network architecture, and/or the like) to perform pattern recognition with regard to patterns of particular historical information associated with a particular predicted compensation amount, a particular predicted compensation date, a particular predicted compensation schedule, and/or the like. In this case, using the artificial neural network processing technique may improve an accuracy of the first machine learning model generated by the monitoring platform by being more robust to noisy, imprecise, or incomplete data, and by enabling the monitoring platform to detect patterns and/or trends undetectable to human analysts or systems using less complex techniques.

In some implementations, a different device, such as the server device and/or the additional server device, may generate and train the first machine learning model. The different device may send the first machine learning model to the monitoring platform. The different device may update and send (e.g., on a scheduled basis, on an on-demand basis, on a triggered basis, and/or the like) the first machine learning model to the monitoring platform.

Accordingly, the monitoring platform may use artificial intelligence techniques, machine learning techniques, deep learning techniques, and/or the like to determine an association between historical information and a particular predicted compensation amount, a particular predicted compensation date, a particular predicted compensation schedule, and/or the like.

Figure 1B:
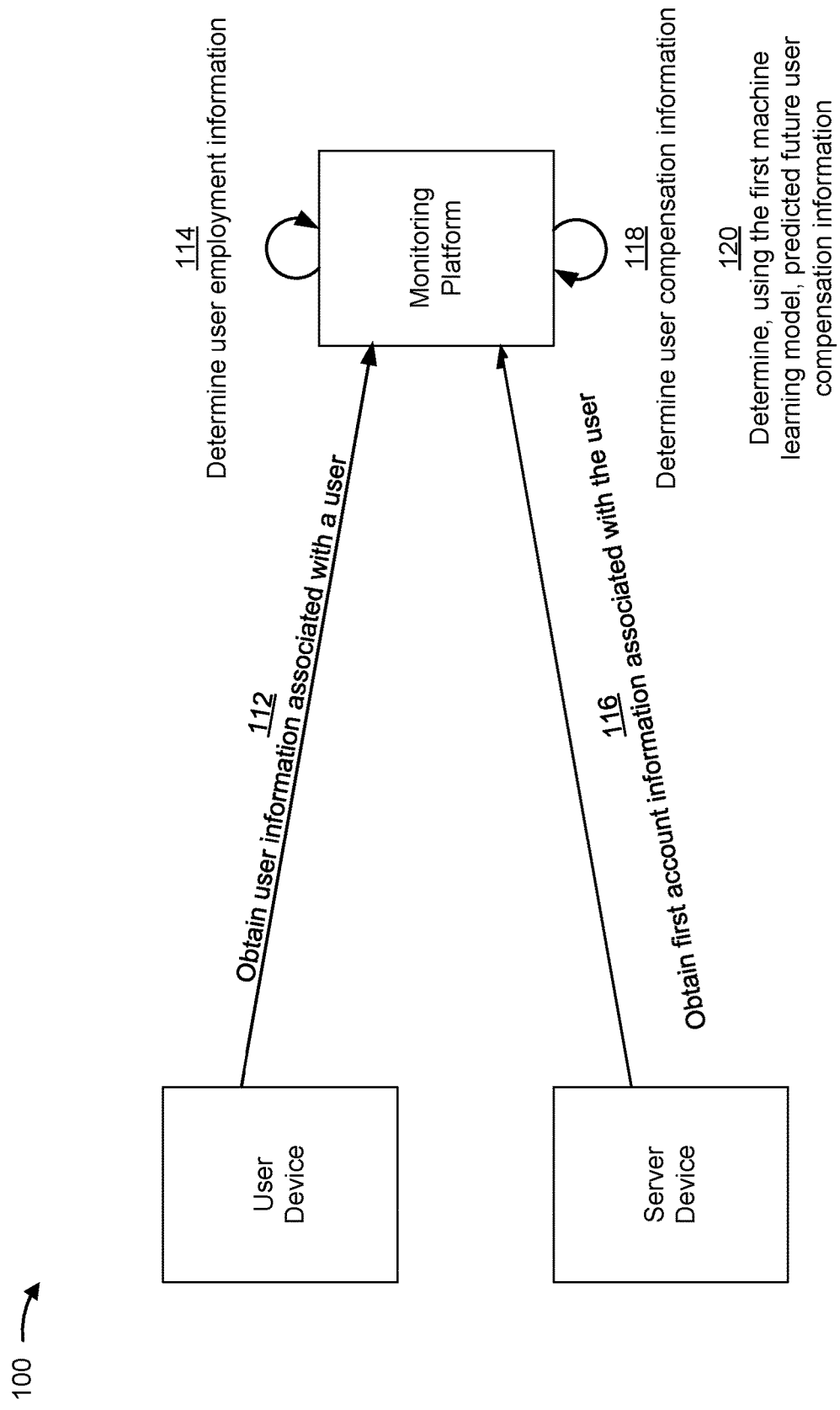

As shown in FIG. 1B, example implementation(s) 100 may include a user device. As shown by reference number 112, the monitoring platform may obtain user information from the user device. The user information may be associated with a user. For example, the user information may include a name of the user; at least one address associated with the user; an employment status of the user; an employment title of the user; an employment type of the user; a name of an employer of the user; at least one address associated with the employer of the user; and/or the like. As shown by reference number 114, the monitoring platform may determine user employment information based on the user information. For example, the monitoring platform may determine the user employment information by processing the user information to identify the employment status of the user; the employment title of the user; the employment type of the user; the name of the employer of the user; the at least one address associated with the employer of the user; and/or the like.

As shown by reference number 116, the monitoring platform may obtain first account information. The first account information may be associated with the user and/or an account (e.g., a social media account, a financial transaction account, and/or the like) of the user. The first account information may include data concerning one or more deposits to the account of the user during a particular period of time (e.g., a day, a week, a month, a year, and/or the like). As shown by reference number 118, the monitoring platform may determine user compensation information based on the first account information. For example, the monitoring platform may determine the user compensation information by processing the first account information to identify one or more compensation deposits, such as paycheck deposits, bonus payment deposits, commission payment deposits, government benefit deposits, and/or the like. The user compensation information may include information concerning at least one non-regular user compensation deposit (e.g., a compensation deposit of a non-regular amount, such as a commission payment deposit; a compensation deposit on a non-regularly scheduled date, such as a one-time bonus payment deposit; and/or the like).

As shown by reference number 120, the monitoring platform may determine predicted future user compensation information. For example, the monitoring platform may process the user employment information and/or the user compensation information to determine the predicted future user compensation information. In some implementations, the monitoring platform may process the user employment information and/or the user compensation information using the first machine learning model to determine the predicted future user compensation information. The predicted future user compensation information may include a predicted compensation amount, a predicted compensation date, a predicted compensation schedule, and/or the like.

As shown in FIG. 1C and by reference number 122, the monitoring platform may obtain second account information from the server device. The second account information may be associated with the user and/or the account of the user. For example, the second account information may include data concerning one or more additional deposits to the account of the user during an additional particular period of time. The additional particular period of time may occur after the particular period of time. For example, the additional particular period of time may be a period of time after the monitoring platform obtained the first account information and before the time monitoring platform obtained the second account information. As shown by reference number 124, the monitoring platform may determine new user compensation information based on the second account information. For example, the monitoring platform may determine the new user compensation information by processing the second account information to identify one or more new compensation deposits. The new user compensation information may include information concerning at least one compensation deposit on a predicted compensation date included in the predicted future user compensation information.

As shown by reference number 126, the monitoring platform may determine whether the new user compensation information is consistent with the predicted future user compensation information. For example, the monitoring platform may determine, based on the predicted future user compensation information, a predicted compensation amount and/or a predicted compensation date and may determine, based on the new user compensation information, a compensation amount associated with the predicted compensation date. The monitoring platform may calculate a difference between the compensation amount and the predicted compensation amount (e.g., subtract the predicted compensation amount from the compensation amount) to determine whether the difference satisfies a difference threshold (e.g., whether the difference is less than the difference threshold).

In some implementations, when the monitoring platform determines that the new user compensation information is consistent with the predicted future user compensation information (e.g., the difference between the compensation amount of the new user compensation information and the predicted amount of the predicted future user compensation information is less than the difference threshold), the monitoring platform may not perform any additional processing steps. Additionally, or alternatively, when the monitoring platform determines the new user compensation information is not consistent with the predicted future user compensation information (e.g., the difference between the compensation amount of the new user compensation information and the predicted amount of the predicted future user compensation information is greater than or equal to the difference threshold), the monitoring platform may perform one or more additional processing steps.

Figure 1D:
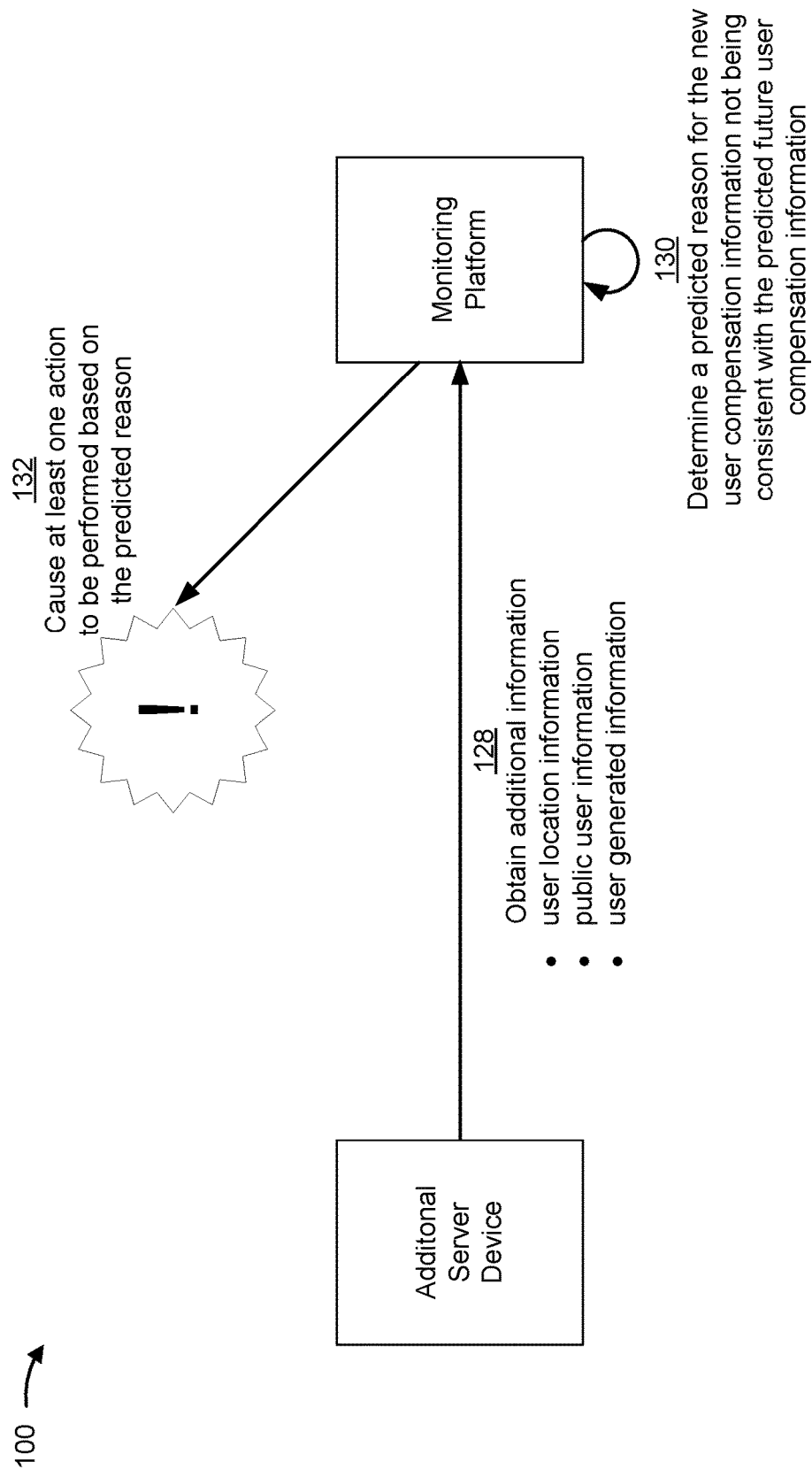

For example, as shown in FIG. 1D and by reference number 128, the monitoring platform may obtain additional information from the server device and/or an additional server device. In some implementations, the monitoring platform may determine, based on the user information, a user account of the user (e.g., a social media user account, a financial transaction user account, and/or the like of the user) and may identify one or more information sources associated with the user account. An information source of the one or more information sources may include a website, an application, a program, and/or the like. For example, an information source may be a website (e.g., Facebook.com, Linkedin.com, a banking website and/or the like), a mobile application (e.g., Snapchat, Instagram, Venmo, Zelle, and/or the like), and/or the like. The information source may be hosted by another device, such as the server device and/or the additional server device. In some implementations, the monitoring platform may obtain the additional information from the one or more information sources. For example, the monitoring platform may crawl one or more information sources (e.g., visit and search the one or more information sources on a scheduled basis, on an on-demand basis, on a triggered basis, on a periodic basis, and/or the like) and scrape the additional information from the one or more information sources (e.g., collect the additional information from the one or more information sources).

The additional information may concern the user and/or the account of the user. For example, the additional information may include financial transaction information that comprises information concerning a location of one or more financial transactions. As another example, the additional information may include user location information (e.g., that is available via an application of a user device associated with the user). In another example, the additional information may include public user information and/or user generated information (e.g., that is available via an information source, such as a social media website). In some implementations, the monitoring platform may process the additional information and/or the second account information to determine the location of the one or more financial transactions, the location information concerning the user, the public user information, the user generated information, and/or the like.

Additionally, or alternatively, as shown by reference number 130, the monitoring platform may determine a predicted reason for the new user compensation information not being consistent with predicted future user compensation information. The monitoring platform may process the second account information and/or the additional information to determine the predicted reason.

In some implementations, the monitoring platform may process the second account information and/or the additional information using a second machine learning model to determine the predicted reason. In some implementations, the monitoring platform may receive, generate, and/or train the second machine learning model in a similar manner as described herein in relation to the first machine learning model. For example, the monitoring platform may generate and/or train the second machine learning model based on historical second account information and/or historical additional information associated with a plurality of users and/or user accounts to predict, for a user, the reason for new user compensation information not being consistent with predicted future user compensation information. Additionally, or alternatively, the monitoring platform may process the historical second account information and/or the historical additional information to train the second machine learning model to determine, for a user, at least one behavior concerning the user and to predict the reason based on the at least one behavior. The predicted reason may include: a change to at least one address associated with the user; a change to an employment status of the user; a change to an employment title of the user; a change to an employment type of the user; a change to a name of an employer of the user; and/or the like. In some implementations, the monitoring platform may perform a set of data manipulation procedures, perform a training operation, use a classification technique, perform a recursive feature elimination procedure, and/or the like as described herein, to determine an association between second account information and/or additional information and a predicted reason.

In some implementations, the monitoring platform may process the second account information and/or the additional information to determine location information concerning the user. The monitoring platform may process the second account information, the additional information, and/or the location information concerning the user using the second machine learning model to determine the predicted reason. In some implementations, the monitoring platform may process the second account information, the additional information, and/or the location information concerning the user using the second machine learning model to determine at least one behavior concerning the user, and may determine the predicted reason based on the at least one behavior concerning the user.

Additionally, or alternatively, as shown by reference number 132, the monitoring platform may cause at least one action to be performed based on the predicted reason. For example, the monitoring platform may enroll, or may cause another device (e.g., the server device, the additional server device, and/or the like) to enroll the account of the user in an account protection plan, such as an overdraft protection plan. In some implementations, the at least one action to be performed may include determining, based on the predicted reason, a monetary credit and causing the monetary credit to be added to the account of the user.

In some implementations, the at least one action to be performed may include: sending, to the user device associated with the user, an instruction for the user to send additional user information to the monitoring platform; receiving, from the user device and based on sending the instruction, the additional user information; and causing the first machine learning model and/or the second machine learning model to be updated based on the additional user information, the user information, the predicted future user compensation information, the first account information, the second account information, and/or the like. In some implementations, the at least one action to be performed may include: causing the first machine learning model and/or the second machine learning model to be updated based on the user information, the user employment information, the predicted future user compensation information, the first account information, the second account information, the new user compensation information, the location information concerning the user, the predicted reason, and/or the like.

In some implementations, the at least one action to be performed may include obtaining information concerning a bill, causing assets of an additional account of the user to be transferred to the account, and scheduling a date for the bill to be paid using assets of the account of the user. In some implementations, the at least one action to be performed may include obtaining information concerning a bill; calculating, based on the predicted reason, a bill discount; generating a message concerning the bill discount; and sending the message to an electronic messaging account associated with a user device of the user. The monitoring platform may cause the bill to be paid based on the bill discount.

In some implementations, the at least one action to be performed may include obtaining information concerning a plurality of bills that are paid via the account of the user; processing the first account information and/or the second account information using a third machine learning model to determine a bill payment priority plan; and causing the plurality of bills to be paid based on the bill payment priority plan. In some implementations, the monitoring platform may receive, generate, and/or train the third machine learning model in a similar manner as described herein in relation to the first machine learning model and the second machine learning model. For example, the monitoring platform may obtain historical account information relating to how users prioritize bill payments to generate and/or train the third machine learning model. In some implementations, the monitoring platform may process the historical account information to train the third machine learning model to predict, for particular account information, a bill payment priority plan. A bill payment priority plan may indicate an order in which to pay one or more bills and/or an amount to apply to the one or more bills. In some implementations, the monitoring platform may perform a set of data manipulation procedures, perform a training operation, use a classification technique, perform a recursive feature elimination procedure, and/or the like as described herein to determine an association between historical account information and a bill payment priority plan.

In some implementations, when the account of the user is associated with an organization, the at least one action to be performed may include determining that a representative of the organization is to communicate with the user; determining a communication device of the representative; and/or causing the communication device of the representative to initiate a communication session with the user device of the user (e.g., by sending a signal with an instruction to initiate the communication session to the communication device of the representative). As another example, the at least one action to be performed may include determining an availability of the user and/or scheduling, based on the availability of the user, a time for the representative of the organization to call the user. In another example, the at least one action to be performed may include initiating a communication session with the user device to enable a virtual assistant to communicate with the user of the user device.

As indicated above, FIGS. 1A-1D are provided merely as an example. Other examples may differ from what is described with regard to FIGS. 1A-1D.

Figure 2:
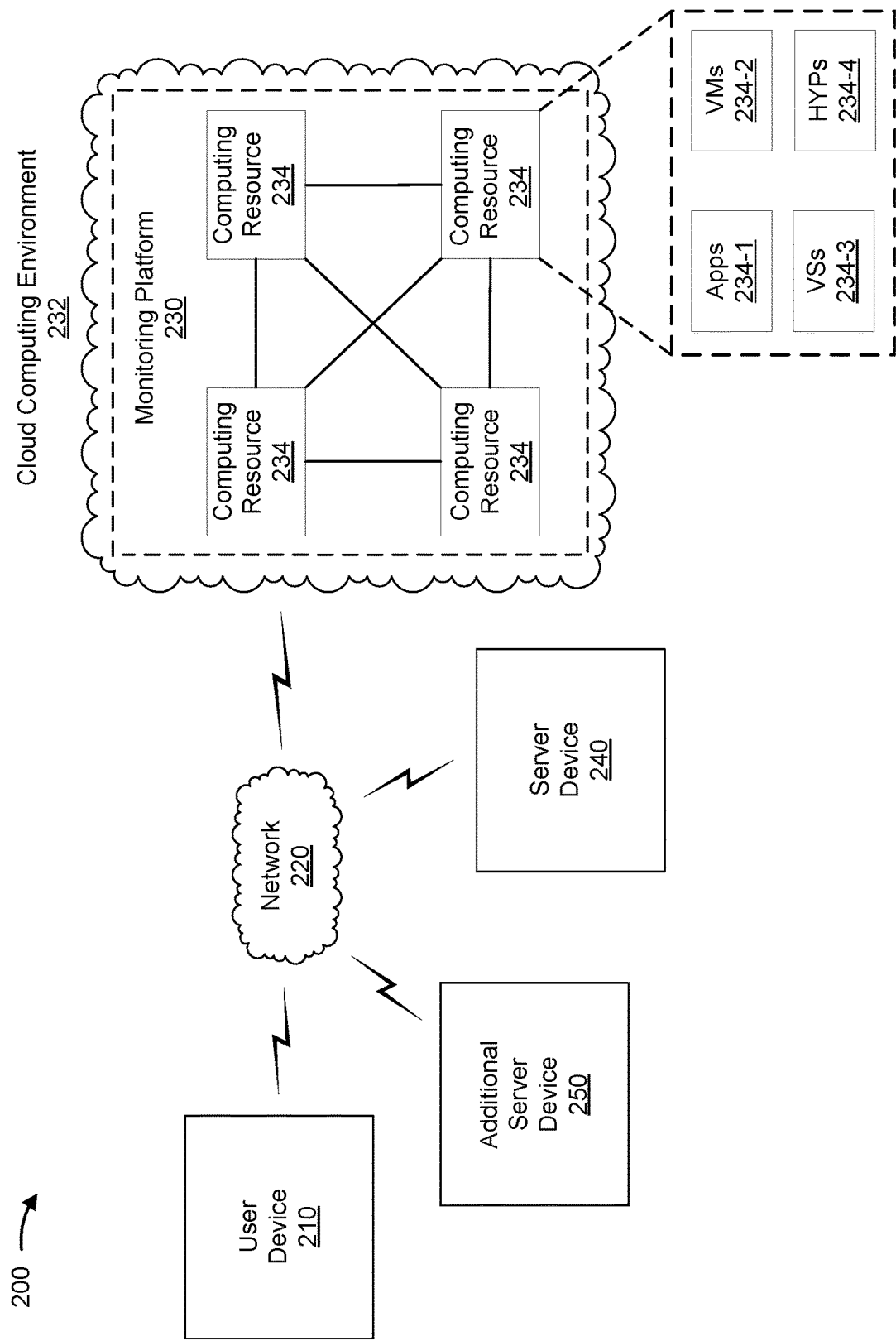
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a network 220, a monitoring platform 230 in a cloud computing environment 232 that includes computing resources 234, a server device 240, an additional server device 250, and/or the like. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. In some implementations, user device 210 may receive information from and/or transmit information to monitoring platform 230, and/or the like.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

Monitoring platform 230 includes one or more devices capable of performing an action based on predicted information. In some implementations, monitoring platform 230 may obtain user information associated with a user and first account information associated with the user. In some implementations, monitoring platform 230 may determine, based on the user information, user employment information and may determine, based on the first account information, user compensation information. In some implementations, monitoring platform 230 may process, using a first machine learning model, the user employment information and the user compensation information to determine predicted future user compensation information. In some implementations, monitoring platform 230 may obtain second account information associated with the user and may determine, based on the second account information, new user compensation information. In some implementations, monitoring platform 230 may determine whether the new user compensation information is consistent with the predicted future user compensation information. In some implementations, monitoring platform 230 may determine a predicted reason for the new user compensation information not being consistent with the predicted future user compensation information. In some implementations, monitoring platform 230 may cause, based on the predicted reason, at least one action to be performed.

In some implementations, monitoring platform 230 may be designed to be modular such that certain software components may be swapped in or out depending on a particular need. As such, monitoring platform 230 may be easily and/or quickly reconfigured for different uses. In some implementations, monitoring platform 230 may receive information from and/or transmit information to user device 210, server device 240, and/or additional server device 250, such as via network 220.

In some implementations, as shown, monitoring platform 230 may be hosted in a cloud computing environment 232. Notably, while implementations described herein describe monitoring platform 230 as being hosted in cloud computing environment 232, in some implementations, monitoring platform 230 may be non-cloud-based (i.e., may be implemented outside of a cloud computing environment) or may be partially cloud-based. Cloud computing environment 232 includes an environment that hosts monitoring platform 230. Cloud computing environment 232 may provide computation, software, data access, storage, etc. services that do not require end-user knowledge of a physical location and configuration of system(s) and/or device(s) that hosts monitoring platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host monitoring platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, and/or the like.

Application 234-1 includes one or more software applications that may be provided to or accessed by user device 210, server device 240, and/or additional server device 250. Application 234-1 may eliminate a need to install and execute the software applications on user device 210, server device 240, and/or additional server device 250. For example, application 234-1 may include software associated with monitoring platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Server device 240 includes one or more devices capable of receiving, generating, storing, processing, and/or providing information, such as information described herein. For example, server device 240 may include a laptop computer, a tablet computer, a desktop computer, a server, a group of servers, or a similar type of device. In some implementations, server device 240 may receive information from and/or transmit information to user device 210, monitoring platform 230, and/or additional server device 250.

Additional server device 250 includes one or more devices capable of receiving, generating, storing, processing, and/or providing information, such as information described herein. For example, additional server device 250 may include a laptop computer, a tablet computer, a desktop computer, a server, a group of servers, or a similar type of device. In some implementations, additional server device 250 may receive information from and/or transmit information to user device 210, monitoring platform 230, and/or server device 240.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
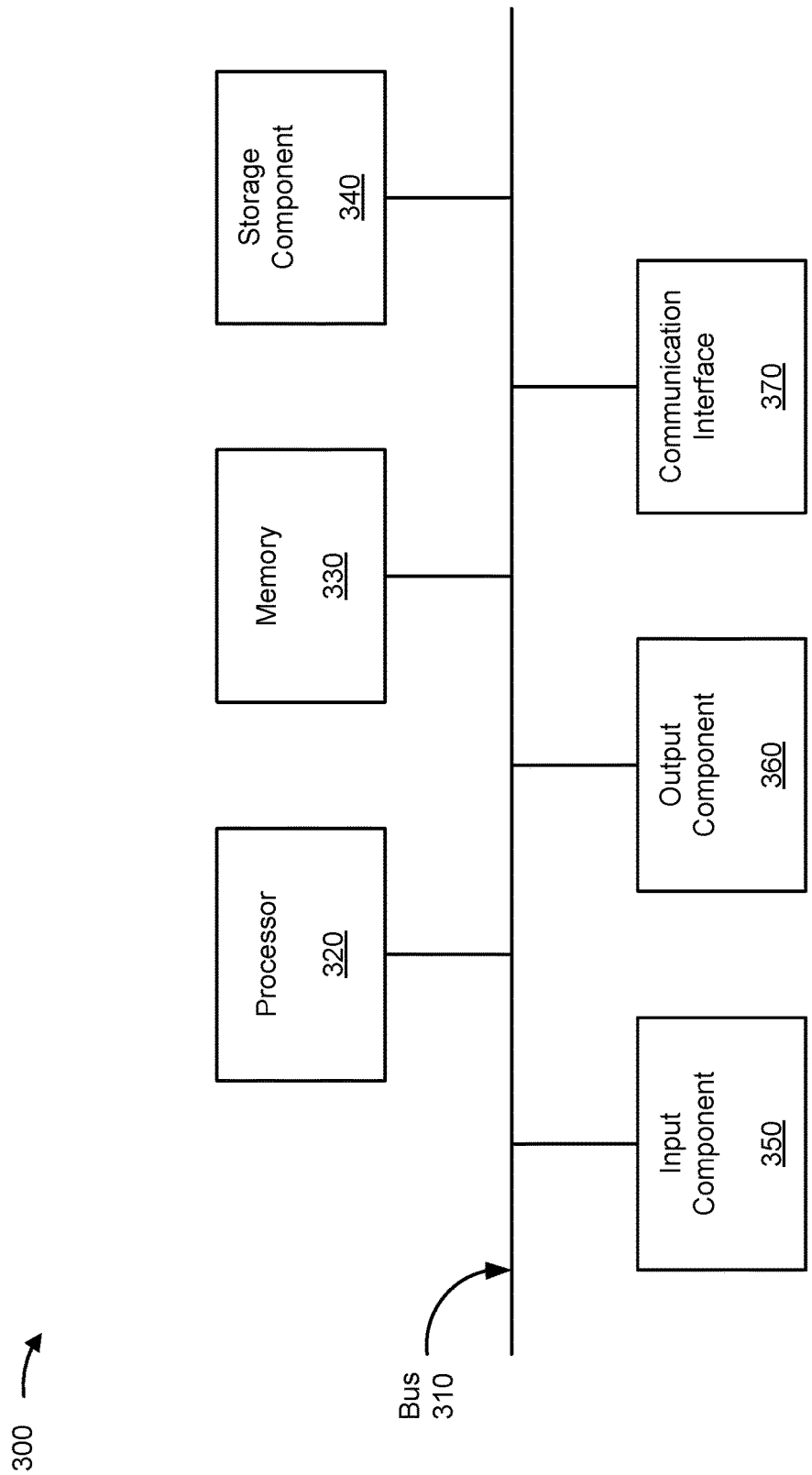
FIG. 3 is a diagram of example components of one or more devices of FIG. 2.

FIG. 3 is a diagram of example components of a device 300. Device 300 may correspond to user device 210, monitoring platform 230, computing resource 234, server device 240, additional server device 250, and/or the like. In some implementations, user device 210, monitoring platform 230, computing resource 234, server device 240, additional server device 250, and/or the like may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for performing an action based on predicted information. In some implementations, one or more process blocks of FIG. 4 may be performed by a monitoring platform (e.g., monitoring platform 230). In some implementations, one or more process blocks of FIG. 4 may be performed by another device or a group of devices separate from or including the monitoring platform, such as a user device (e.g., user device 210), a server device (e.g., server device 240), an additional server device (e.g., additional server device 250), and/or the like.

As shown in FIG. 4, process 400 may include obtaining user information associated with a user (block 405). For example, the monitoring platform (e.g., using computing resource 234, processor 320, memory 330, storage component 340, input component 350, output component 360, communication interface 370 and/or the like) may obtain user information associated with a user, as described above.

As further shown in FIG. 4, process 400 may include obtaining first account information associated with the user (block 410). For example, the monitoring platform (e.g., using computing resource 234, processor 320, memory 330, storage component 340, input component 350, output component 360, communication interface 370 and/or the like) may obtain first account information associated with the user, as described above.

As further shown in FIG. 4, process 400 may include determining, based on the user information, user employment information (block 415). For example, the monitoring platform (e.g., using computing resource 234, processor 320, memory 330, storage component 340, input component 350, output component 360, communication interface 370 and/or the like) may determine, based on the user information, user employment information, as described above.

As further shown in FIG. 4, process 400 may include determining, based on the first account information, user compensation information wherein the user compensation information includes information concerning at least one non-regular user compensation deposit (block 420). For example, the monitoring platform (e.g., using computing resource 234, processor 320, memory 330, storage component 340, input component 350, output component 360, communication interface 370 and/or the like) may determine, based on the first account information, user compensation information, as described above. In some implementations, the user compensation information includes information concerning at least one non-regular user compensation deposit.

As further shown in FIG. 4, process 400 may include processing, using a first machine learning model, the user employment information and the user compensation information to determine predicted future user compensation information (block 425). For example, the monitoring platform (e.g., using computing resource 234, processor 320, memory 330, storage component 340, input component 350, output component 360, communication interface 370 and/or the like) may process, using a first machine learning model, the user employment information and the user compensation information to determine predicted future user compensation information, as described above.

As further shown in FIG. 4, process 400 may include obtaining, after determining the predicted future user compensation information, second account information associated with the user (block 430). For example, the monitoring platform (e.g., using computing resource 234, processor 320, memory 330, storage component 340, input component 350, output component 360, communication interface 370 and/or the like) may obtain, after determining the predicted future user compensation information, second account information associated with the user, as described above.

As further shown in FIG. 4, process 400 may include determining, based on the second account information, new user compensation information (block 435). For example, the monitoring platform (e.g., using computing resource 234, processor 320, memory 330, storage component 340, input component 350, output component 360, communication interface 370 and/or the like) may determine, based on the second account information, new user compensation information, as described above.

As further shown in FIG. 4, process 400 may include determining whether the new user compensation information is consistent with the predicted future user compensation information (block 440). For example, the monitoring platform (e.g., using computing resource 234, processor 320, memory 330, storage component 340, input component 350, output component 360, communication interface 370 and/or the like) may determine whether the new user compensation information is consistent with the predicted future user compensation information, as described above.

As further shown in FIG. 4, process 400 may include processing, based on determining that the new user compensation information is not consistent with the predicted future user compensation information, the second account information using a second machine learning model to determine a predicted reason for the new user compensation information not being consistent with the predicted future user compensation information (block 445). For example, the monitoring platform (e.g., using computing resource 234, processor 320, memory 330, storage component 340, input component 350, output component 360, communication interface 370 and/or the like) may process, based on determining that the new user compensation information is not consistent with the predicted future user compensation information, the second account information using a second machine learning model to determine a predicted reason for the new user compensation information not being consistent with the predicted future user compensation information, as described above.

As further shown in FIG. 4, process 400 may include causing, based on the predicted reason, at least one action to be performed (block 450). For example, the monitoring platform (e.g., using computing resource 234, processor 320, memory 330, storage component 340, input component 350, output component 360, communication interface 370 and/or the like) may cause, based on the predicted reason, at least one action to be performed, as described above.

Process 400 may include additional implementations, such as any single implementation or any combination of implementations described below and/or in connection with one or more other processes described elsewhere herein.

In some implementations, the first account information and the second account information are associated with an account of the user. In some implementations, causing the at least one action to be performed comprises enrolling the account of the user in an account protection plan.

In some implementations, the user information includes at least one of: a name of the user; at least one address associated with the user; an employment status of the user; an employment title of the user; an employment type of the user; a name of an employer of the user; or at least one address associated with the employer of the user. In some implementations, the predicted future user compensation information includes: a predicted compensation amount; and a predicted compensation date.

In some implementations, processing the second account information using the second machine learning model to determine the predicted reason comprises processing the second account information to determine location information concerning the user and processing the location information concerning the user using the second machine learning model to determine the predicted reason.

In some implementations, causing the at least one action to be performed comprises sending, to a user device associated with the user, an instruction for the user to send additional user information; receiving, from the user device and based on sending the instruction, the additional user information; and causing the first machine learning model to be updated based on at least one of the additional user information, the user information, the predicted future user compensation information, the first account information, or the second account information.

In some implementations, the first account information and the second account information are associated with an account of the user. In some implementations, causing the at least one action to be performed comprises: obtaining information concerning a bill, causing assets of an additional account of the user to be transferred to the account, and scheduling a date for the bill to be paid using assets of the account. In some implementations, causing the at least one action to be performed comprises: obtaining information concerning a plurality of bills that are paid via the account, processing the first account information and the second account information using a third machine learning model to determine a bill payment priority plan, and causing the plurality of bills to be paid based on the bill payment priority plan.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for performing an action based on predicted information. In some implementations, one or more process blocks of FIG. 5 may be performed by a monitoring platform (e.g., monitoring platform 230). In some implementations, one or more process blocks of FIG. 5 may be performed by another device or a group of devices separate from or including the monitoring platform, such as a user device (e.g., user device 210), a server device (e.g., server device 240), an additional server device (e.g., additional server device 250), and/or the like.

As shown in FIG. 5, process 500 may include obtaining user information associated with a user (block 505). For example, the monitoring platform (e.g., using computing resource 234, processor 320, memory 330, storage component 340, input component 350, output component 360, communication interface 370 and/or the like) may obtain user information associated with a user, as described above.

As further shown in FIG. 5, process 500 may include obtaining first account information associated with an account of the user (block 510). For example, the monitoring platform (e.g., using computing resource 234, processor 320, memory 330, storage component 340, input component 350, output component 360, communication interface 370 and/or the like) may obtain first account information associated with an account of the user, as described above.

As further shown in FIG. 5, process 500 may include determining, based on the user information, user employment information (block 515). For example, the monitoring platform (e.g., using computing resource 234, processor 320, memory 330, storage component 340, input component 350, output component 360, communication interface 370 and/or the like) may determine, based on the user information, user employment information, as described above.

As further shown in FIG. 5, process 500 may include determining, based on the first account information, user compensation information, wherein the user compensation information includes information concerning at least one non-regular user compensation deposit (block 520). For example, the monitoring platform (e.g., using computing resource 234, processor 320, memory 330, storage component 340, input component 350, output component 360, communication interface 370 and/or the like) may determine, based on the first account information, user compensation information, as described above. In some implementations, the user compensation information includes information concerning at least one non-regular user compensation deposit.

As further shown in FIG. 5, process 500 may include processing, using a first machine learning model, the user employment information and the user compensation information to determine predicted future user compensation information (block 525). For example, the monitoring platform (e.g., using computing resource 234, processor 320, memory 330, storage component 340, input component 350, output component 360, communication interface 370 and/or the like) may process, using a first machine learning model, the user employment information and the user compensation information to determine predicted future user compensation information, as described above.

As further shown in FIG. 5, process 500 may include obtaining, after determining the predicted future user compensation information, second account information associated with the account of the user (block 530). For example, the monitoring platform (e.g., using computing resource 234, processor 320, memory 330, storage component 340, input component 350, output component 360, communication interface 370 and/or the like) may obtain, after determining the predicted future user compensation information, second account information associated with the account of the user, as described above.

As further shown in FIG. 5, process 500 may include determining, based on the second account information, new user compensation information (block 535). For example, the monitoring platform (e.g., using computing resource 234, processor 320, memory 330, storage component 340, input component 350, output component 360, communication interface 370 and/or the like) may determine, based on the second account information, new user compensation information, as described above.

As further shown in FIG. 5, process 500 may include determining whether the new user compensation information is consistent with the predicted future user compensation information (block 540). For example, the monitoring platform (e.g., using computing resource 234, processor 320, memory 330, storage component 340, input component 350, output component 360, communication interface 370 and/or the like) may determine whether the new user compensation information is consistent with the predicted future user compensation information, as described above.

As further shown in FIG. 5, process 500 may include obtaining, based on determining that the new user compensation information is not consistent with the predicted future user compensation information, additional information concerning the user (block 545). For example, the monitoring platform (e.g., using computing resource 234, processor 320, memory 330, storage component 340, input component 350, output component 360, communication interface 370 and/or the like) may obtain, based on determining that the new user compensation information is not consistent with the predicted future user compensation information, additional information concerning the user, as described above.

As further shown in FIG. 5, process 500 may include processing, using a second machine learning model, the second account information and the additional information concerning the user to determine a predicted reason for the new user compensation information not being consistent with the predicted future user compensation information (block 550). For example, the monitoring platform (e.g., using computing resource 234, processor 320, memory 330, storage component 340, input component 350, output component 360, communication interface 370 and/or the like) may process, using a second machine learning model, the second account information and the additional information concerning the user to determine a predicted reason for the new user compensation information not being consistent with the predicted future user compensation information, as described above.

As further shown in FIG. 5, process 500 may include causing, based on the predicted reason, at least one action to be performed (block 555). For example, the monitoring platform (e.g., using computing resource 234, processor 320, memory 330, storage component 340, input component 350, output component 360, communication interface 370 and/or the like) may cause, based on the predicted reason, at least one action to be performed, as described above.

Process 500 may include additional implementations, such as any single implementation or any combination of implementations described below and/or in connection with one or more other processes described elsewhere herein.

In some implementations, the first account information includes data concerning one or more deposits to the account of the user during a particular period of time. In some implementations, the second account information includes data concerning one or more additional deposits to the account of the user during an additional particular period of time. In some implementations, the additional particular period of time occurs after the particular period of time.

In some implementations, the predicted reason includes at least one of: a change to at least one address associated with the user; a change to an employment status of the user; a change to an employment title of the user; a change to an employment type of the user; or a change to a name of an employer of the user.

In some implementations, the monitoring platform, when obtaining the additional information concerning the user, may determine, based on the user information, a user account of the user, may identify one or more information sources associated with the user account, and may obtain the additional information concerning the user from the one or more information sources.

In some implementations, the monitoring platform, when processing the second account information and the additional information concerning the user to determine the predicted reason, may process the additional information to determine location information concerning the user, and may process the second account information and the location information concerning the user, using the second machine learning model, to determine the predicted reason.

In some implementations, the monitoring platform, when causing the at least one action to be performed, may obtain information concerning a bill, may calculate, based on the predicted reason, a bill discount, may generate a message concerning the bill discount, and may send the message to an electronic messaging account associated with a user device of the user.

In some implementations, the monitoring platform, when causing the at least one action to be performed, may determine, based on the predicted reason, a monetary credit and may cause the monetary credit to be added to the account of the user.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for performing an action based on predicted information. In some implementations, one or more process blocks of FIG. 6 may be performed by a monitoring platform (e.g., monitoring platform 230). In some implementations, one or more process blocks of FIG. 6 may be performed by another device or a group of devices separate from or including the monitoring platform, such as a user device (e.g., user device 210), a server device (e.g., server device 240), an additional server device (e.g., additional server device 250), and/or the like.

As shown in FIG. 6, process 600 may include obtaining user information associated with a user (block 605). For example, the monitoring platform (e.g., using computing resource 234, processor 320, memory 330, storage component 340, input component 350, output component 360, communication interface 370 and/or the like) may obtain user information associated with a user, as described above.

As further shown in FIG. 6, process 600 may include obtaining first account information associated with the user (block 610). For example, the monitoring platform (e.g., using computing resource 234, processor 320, memory 330, storage component 340, input component 350, output component 360, communication interface 370 and/or the like) may obtain first account information associated with the user, as described above.

As further shown in FIG. 6, process 600 may include determining, based on the user information, user employment information (block 615). For example, the monitoring platform (e.g., using computing resource 234, processor 320, memory 330, storage component 340, input component 350, output component 360, communication interface 370 and/or the like) may determine, based on the user information, user employment information, as described above.

As further shown in FIG. 6, process 600 may include determining, based on the first account information, user compensation information (block 620). For example, the monitoring platform (e.g., using computing resource 234, processor 320, memory 330, storage component 340, input component 350, output component 360, communication interface 370 and/or the like) may determine, based on the first account information, user compensation information, as described above.

As further shown in FIG. 6, process 600 may include processing, using a first machine learning model, the user employment information and the user compensation information to determine predicted future user compensation information (block 625). For example, the monitoring platform (e.g., using computing resource 234, processor 320, memory 330, storage component 340, input component 350, output component 360, communication interface 370 and/or the like) may process, using a first machine learning model, the user employment information and the user compensation information to determine predicted future user compensation information, as described above.

As further shown in FIG. 6, process 600 may include obtaining second account information associated with the user (block 630). For example, the monitoring platform (e.g., using computing resource 234, processor 320, memory 330, storage component 340, input component 350, output component 360, communication interface 370 and/or the like) may obtain second account information associated with the user, as described above.

As further shown in FIG. 6, process 600 may include determining, based on the second account information, new user compensation information (block 635). For example, the monitoring platform (e.g., using computing resource 234, processor 320, memory 330, storage component 340, input component 350, output component 360, communication interface 370 and/or the like) may determine, based on the second account information, new user compensation information, as described above.

As further shown in FIG. 6, process 600 may include determining whether the new user compensation information is consistent with the predicted future user compensation information (block 640). For example, the monitoring platform (e.g., using computing resource 234, processor 320, memory 330, storage component 340, input component 350, output component 360, communication interface 370 and/or the like) may determine whether the new user compensation information is consistent with the predicted future user compensation information, as described above.

As further shown in FIG. 6, process 600 may include obtaining, based on determining that the new user compensation information is not consistent with the predicted future user compensation information, location information concerning the user (block 645). For example, the monitoring platform (e.g., using computing resource 234, processor 320, memory 330, storage component 340, input component 350, output component 360, communication interface 370 and/or the like) may obtain, based on determining that the new user compensation information is not consistent with the predicted future user compensation information, location information concerning the user, as described above.

As further shown in FIG. 6, process 600 may include processing, using a second machine learning model, the second account information and the location information concerning the user to determine a predicted reason for the new user compensation information not being consistent with the predicted future user compensation information (block 650). For example, the monitoring platform (e.g., using computing resource 234, processor 320, memory 330, storage component 340, input component 350, output component 360, communication interface 370 and/or the like) may process, using a second machine learning model, the second account information and the location information concerning the user to determine a predicted reason for the new user compensation information not being consistent with the predicted future user compensation information, as described above.

As further shown in FIG. 6, process 600 may include causing, based on the predicted reason, at least one action to be performed (block 655). For example, the monitoring platform (e.g., using computing resource 234, processor 320, memory 330, storage component 340, input component 350, output component 360, communication interface 370 and/or the like) may cause, based on the predicted reason, at least one action to be performed, as described above.

Process 600 may include additional implementations, such as any single implementation or any combination of implementations described below and/or in connection with one or more other processes described elsewhere herein.

In some implementations, the monitoring platform, when determining whether the new user compensation information is consistent with the predicted future user compensation information, may determine, based on the predicted future user compensation information, a predicted compensation amount and a predicted compensation date; may determine, based on the new user compensation information, a compensation amount associated with the predicted compensation date; may calculate a difference between the compensation amount and the predicted compensation amount; and may determine whether the difference satisfies a difference threshold.

In some implementations, the monitoring platform, when processing the second account information and the location information concerning the user to determine the predicted reason, may process the second account information and the location information concerning the user using the second machine learning model to determine at least one behavior concerning the user and may determine the predicted reason based on the at least one behavior concerning the user.

In some implementations the monitoring platform, when causing the at least one action to be performed, may cause the first machine learning model or the second machine learning model to be updated based on at least one of the user information, the user employment information, the predicted future user compensation information, the first account information, the second account information, the new user compensation information, the location information concerning the user, or the predicted reason.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

obtaining, by a device, user information associated with a user and first account information associated with the user;

determining, by the device and based on the user information, user employment information;

determining, by the device and based on the first account information, user compensation information;

processing, by the device and using a first machine learning model, the user employment information and the user compensation information to determine predicted future user compensation information, wherein the first machine learning model is trained based on at least a neural network technique that performs pattern recognition with regard to patterns of particular historical information associated with at least one of a particular predicted compensation amount, a particular predicted compensation date, or a particular predicted compensation schedule;

determining, by the device and based on the predicted future user compensation information, a predicted compensation amount and a predicted compensation date;

obtaining, by the device and after determining the predicted future user compensation information, second account information associated with the user;

determining, by the device and based on the second account information, new user compensation information;

determining, by the device, that a difference between a compensation amount associated with the predicted compensation date and the predicted compensation amount is greater than or equal to a threshold, wherein the compensation amount is determined based on the new user compensation information;

determining, by the device and based on determining that the difference between the compensation amount associated with the predicted compensation date and the predicted compensation amount is greater than or equal to the threshold, that the new user compensation information is not consistent with the predicted future user compensation information;

identifying, by the device and based on the user information, one or more information sources that are different from a source of the user information, the first account, and the second account information;

obtaining, by the device and based on determining that the new user compensation information is not consistent with the predicted future user compensation information, additional information concerning the user from the one or more information sources, wherein the additional information associated with the user is obtained based on the device causing at least one of crawling or scraping the additional information from the one or more information sources;

processing, by the device and based on determining that the new user compensation information is not consistent with the predicted future user compensation information, the second account information and the additional information concerning the user by using a second machine learning model to determine a predicted reason for the new user compensation information not being consistent with the predicted future user compensation information; and performing, by the device and based on the predicted reason, an action comprising:

identifying a communication device associated with a representative of an organization that is associated with at least one of the first account information or the second account information, and establishing a first communication session between the communication device and another device.

2. The method of claim 1, wherein the first account information and the second account information are associated with an account of the user, wherein causing the action to be performed further comprises:

enrolling the account of the user in an account protection plan.

3. The method of claim 1, wherein the user information includes at least one of:

a name of the user;

at least one address associated with the user;

an employment status of the user;

an employment title of the user;

an employment type of the user;

a name of an employer of the user; or at least one address associated with the employer of the user.

4. The method of claim 1, wherein causing the action to be performed further comprises:

sending, to the other device, an instruction for the user to send another additional information concerning the user;

receiving, from the other device and based on sending the instruction, the other additional information concerning the user; and causing the first machine learning model to be updated based on at least one of the other additional information concerning the user, the user information, the predicted future user compensation information, the first account information, or the second account information.

5. The method of claim 1, wherein the first account information and the second account information are associated with a first account of the user, wherein causing the action to be performed further comprises:

obtaining information concerning a bill;

causing assets of a second account of the user to be transferred to the first account of the user; and scheduling a date for the bill to be paid using assets of the first account of the user.

6. The method of claim 1, wherein the first account information and the second account information are associated with an account of the user, wherein causing the action to be performed comprises:

obtaining information concerning a plurality of bills that are paid via the account of the user;

processing the first account information and the second account information using a third machine learning model to determine a bill payment priority plan; and causing the plurality of bills to be paid based on the bill payment priority plan.

7. A device, comprising:

one or more memories; and one or more processors, communicatively coupled to the one or more memories, to:

obtain user information associated with a user and first account information associated with an account of the user;

determine, based on the user information, user employment information;
determine, based on the first account information, user compensation information;
process, using a first machine learning model, the user employment information and the user compensation information to determine predicted future user compensation information,
 wherein the first machine learning model is trained based on at least a neural network technique that performs pattern recognition with regard to patterns of particular historical information associated with at least one of a particular predicted compensation amount, a particular predicted compensation date, or a particular predicted compensation schedule;
determine, based on the predicted future user compensation information, a predicted compensation amount and a predicted compensation date;
obtain, after determining the predicted future user compensation information, second account information associated with the account of the user;
determine, based on the second account information, new user compensation information;
determine that a difference between a compensation amount associated with the predicted compensation date and the predicted compensation amount is greater than or equal to a threshold,
 wherein the compensation amount is determined based on the new user compensation information;
determine, based on determining that the difference between the compensation amount associated with the predicted compensation date and the predicted compensation amount is greater than or equal to the threshold, that the new user compensation information is not consistent with the predicted future user compensation information;
identify, based on the user information, one or more information sources that are different from a source of the user information, the first account, and the second account information;
obtain, based on determining that the new user compensation information is not consistent with the predicted future user compensation information, additional information concerning the user from the one or more information sources,
 wherein the additional information associated with the user is obtained based on the device causing at least one of crawling or scraping the additional information from the one or more information sources;
process, using a second machine learning model, the second account information and the additional information concerning the user to determine a predicted reason for the new user compensation information not being consistent with the predicted future user compensation information; and
perform, based on the predicted reason, an action comprising:
 identifying a communication device associated with a representative of an organization that is associated with at least one of the first account information or the second account information, and
 establishing a first communication session between the communication device and another device.

8. The device of claim 7, wherein the first account information includes data concerning one or more deposits to the account of the user during a particular period of time.

9. The device of claim 8, wherein the second account information includes data concerning one or more additional deposits to the account of the user during an additional particular period of time,
 wherein the additional particular period of time occurs after the particular period of time.

10. The device of claim 7, wherein the predicted reason includes at least one of:
 a change to at least one address associated with the user;
 a change to an employment status of the user;
 a change to an employment title of the user;
 a change to an employment type of the user; or
 a change to a name of an employer of the user.

11. The device of claim 7, wherein, when obtaining the additional information concerning the user, the one or more processors are to determine a user account of the user based on the user information.

12. The device of claim 7, wherein the one or more processors, when causing the at action to be performed, are further to:
 obtain information concerning a bill;
 calculate, based on the predicted reason, a bill discount;
 generate a message concerning the bill discount; and
 send the message to an electronic messaging account associated with the other device.

13. The device of claim 7, wherein the one or more processors, when causing the action to be performed, are further to:
 determine, based on the predicted reason, a monetary credit; and
 cause the monetary credit to be added to the account of the user.

14. A non-transitory computer-readable medium storing instructions, the instructions comprising:
 one or more instructions that, when executed by one or more processors, cause the one or more processors to:
  obtain user information associated with a user and first account information associated with the user;
  determine, based on the user information, user employment information;
  determine, based on the first account information, user compensation information;
  process, using a first machine learning model, the user employment information and the user compensation information to determine predicted future user compensation information,
   wherein the first machine learning model is trained based on at least a neural network technique that performs pattern recognition with regard to patterns of particular historical information associated with at least one of a particular predicted compensation amount, a particular predicted compensation date, or a particular predicted compensation schedule;
  determine, based on the predicted future user compensation information, a predicted compensation amount and a predicted compensation date;
  obtain second account information associated with the user;
  determine, based on the second account information, new user compensation information;
  determine that a difference between a compensation amount associated with the predicted compensation date and the predicted compensation amount is greater than or equal to a threshold,
  wherein the compensation amount is determined based on the new user compensation information;
determine, based on determining that the difference between the compensation amount associated with the predicted compensation date and the predicted compensation amount is greater than or equal to the threshold, that the new user compensation information is not consistent with the predicted future user compensation information;
identify, based on the user information, one or more information sources that are different from a source of the user information, the first account, and the second account information;
obtain, based on determining that the new user compensation information is not consistent with the predicted future user compensation information, additional information concerning the user from the one or more information sources,
  wherein the additional information associated with the user is obtained based causing at least one of crawling or scraping the additional information from the one or more information sources;
obtain, based on determining that the new user compensation information is not consistent with the predicted future user compensation information, location information concerning the user;
process, using a second machine learning model, the second account information, the additional information concerning the user, and the location information concerning the user to determine a predicted reason for the new user compensation information not being consistent with the predicted future user compensation information; and
perform, based on the predicted reason, an action comprising
  identifying a communication device associated with a representative of an organization that is associated with at least one of the first account information or the second account information, and
  establishing a first communication session between the communication device and the other device.

15. The non-transitory computer-readable medium of claim 14, wherein the one or more instructions, that cause the one or more processors to process the second account information, the additional information concerning the user, and the location information concerning the user to determine the predicted reason, cause the one or more processors to:
  process the second account information and the location information concerning the user using the second machine learning model to determine at least one behavior concerning the user; and
  determine the predicted reason based on the at least one behavior concerning the user.

16. The non-transitory computer-readable medium of claim 14, wherein the one or more instructions, that cause the one or more processors to cause the action to be performed, further cause the one or more processors to:
  cause the first machine learning model or the second machine learning model to be updated based on at least one of the user information, the user employment information, the predicted future user compensation information, the first account information, the second account information, the new user compensation information, the location information concerning the user, or the predicted reason.

17. The method of claim 1, wherein obtaining the user information associated with the user comprises obtaining the user information associated with the user from the other device; and
  wherein obtaining the first account information associated with the user comprises obtaining the first account information associated with the user from a server device.

18. The device of claim 7, wherein the one or more processors, when obtaining the user information associated with the user, are to obtain the user information associated with the user from the other device; and
  wherein the one or more processors, when obtaining the first account information associated with the user, are to obtain the first account information associated with the user from a server device.

19. The method of claim 1, wherein causing the action to be performed further comprises:
  initiating the communication session with a virtual assistant.

20. The non-transitory computer-readable medium of claim 14, wherein the one or more instructions, that cause the one or more processors to cause the action to be performed, further cause the one or more processors to:
  initiate the communication session with a virtual assistant.

* * * * *